March 2, 1965 A. D. EDWARDS 3,171,499
PLANT PACKER
Filed March 6, 1963 2 Sheets-Sheet 1
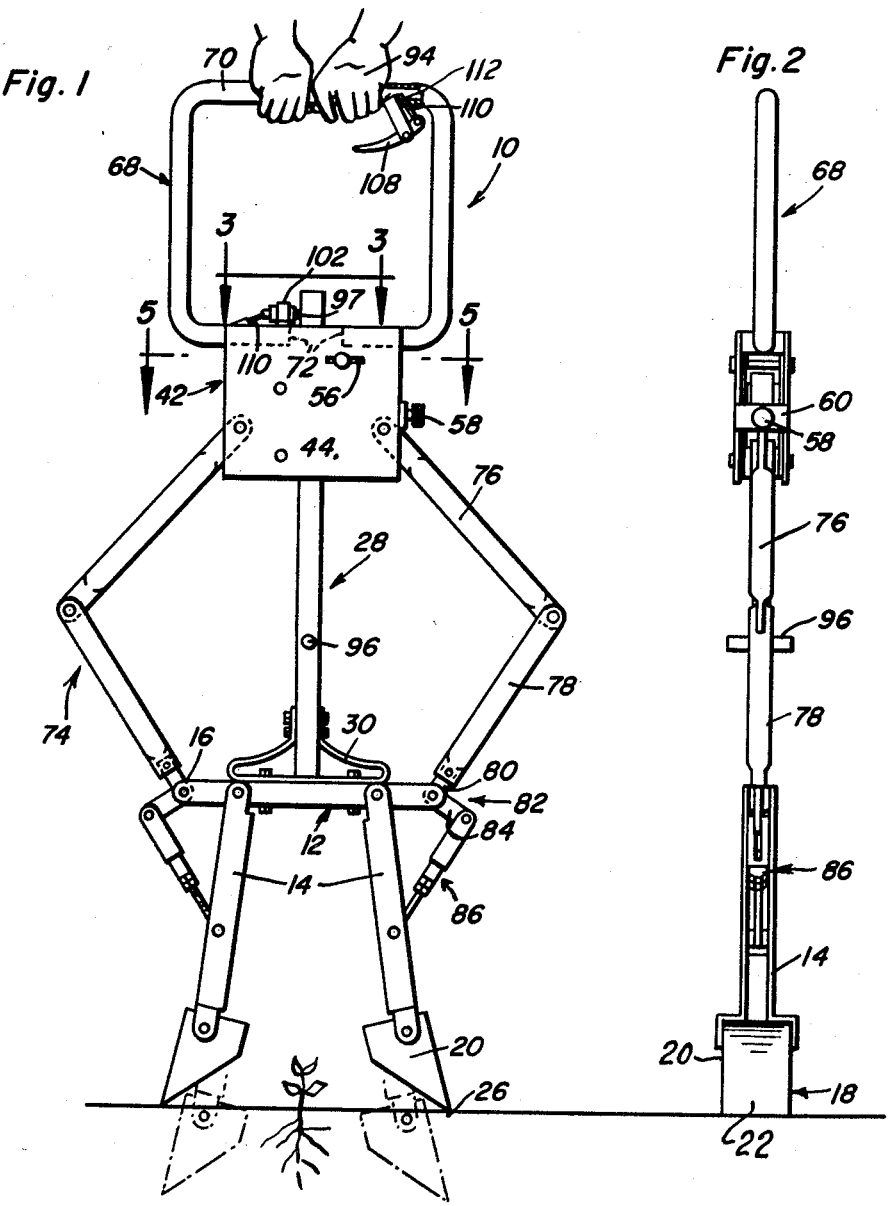
Arnold D. Edwards
INVENTOR.

March 2, 1965  A. D. EDWARDS  3,171,499
PLANT PACKER
Filed March 6, 1963  2 Sheets-Sheet 2
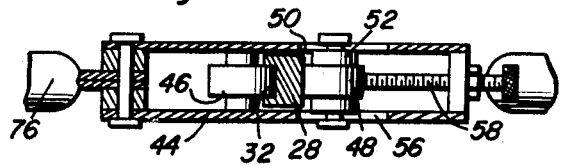
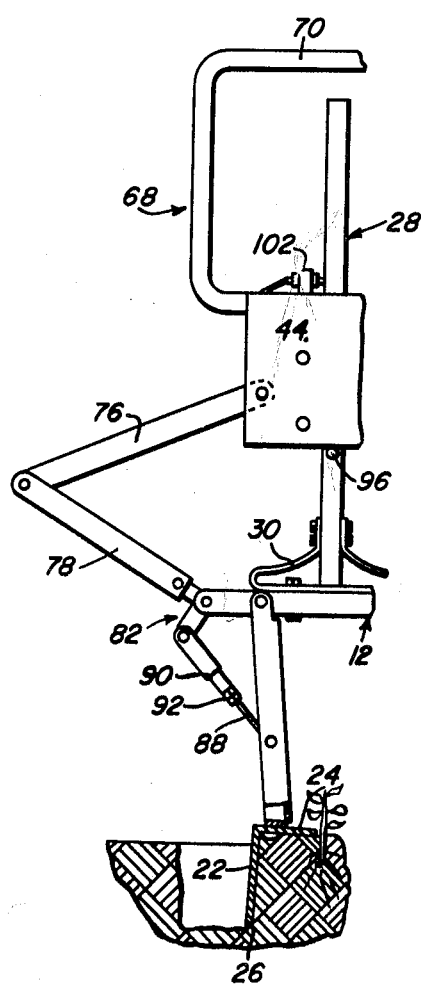
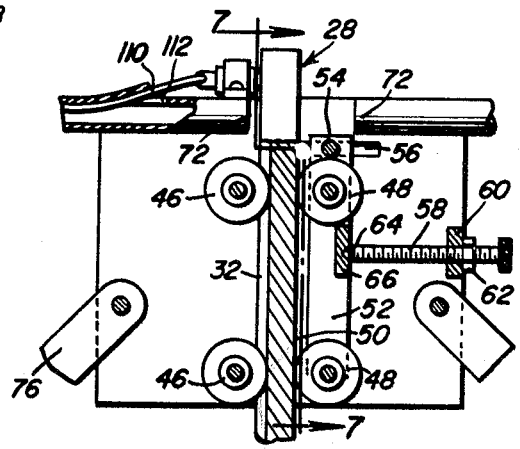
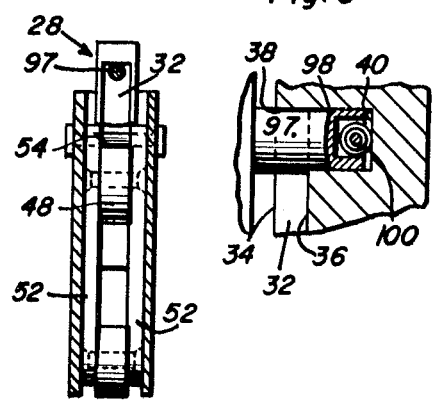
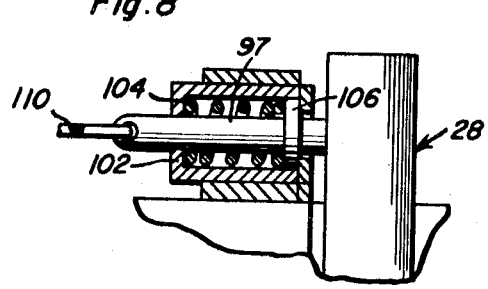
Arnold D. Edwards
INVENTOR.
BY *Clarence A. O'Brien*
*and Harvy T. Jackson*
Attorneys

3,171,499
PLANT PACKER
Arnold D. Edwards, 1366 W. 30th St., Jacksonville 9, Fla.
Filed Mar. 6, 1963, Ser. No. 263,244
8 Claims. (Cl. 172—371)

The present invention is generally directed toward plant packers, and is more specifically concerned with an improvement over the plant packer of applicant's earlier Patent No. 2,638,713.

It is basically the primary object of the present invention to provide a plant packer which is operable from a standing position and which includes a pair of opposed jaws engageable with the earth on opposite sides of a plant and subsequently movable so as to pack the earth about the plant.

In accomplishing this basic object, it is also an object of the present invention to incorporate a locking means into the plant packer whereby the packing jaws can be locked in an open position so as to insure a proper and complete driving of the jaws into the ground prior to the closing of the jaws.

Likewise, it is an object of the present invention to provide a trigger control for the release of the locking means, this trigger control being positionable so as to allow for its activation without the necessity of the user of the packer removing his hands from the handle.

A further object of the present invention resides in the incorporation into the packer of means for adjusting the opening and closing of the jaws.

Furthermore, it is intended that the plant packer of the present invention be both simple to use and capable of use over extended periods of time with only a minimum amount of effort on the part of the user.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view of the plant packer comprising the present invention illustrating a preferred manner of holding the packer during the driving thereof;

FIGURE 2 is a side elevational view of the packer;

FIGURE 3 is an enlarged view taken substantially on a plane passing along line 3—3 in FIGURE 1;

FIGURE 4 is a partial elevational view of the packer with the packing jaw on one side thereof being shown in section, this jaw being in its closed or packing position;

FIGURE 5 is an enlarged cross-sectional view taken substantially on a plane passing along line 5—5 in FIGURE 1;

FIGURE 6 is a cross-sectional view taken substantially on a plane passing along line 6—6 in FIGURE 3;

FIGURE 7 is a cross-sectional view taken substantially on a plane passing along line 7—7 in FIGURE 6;

FIGURE 8 is a view of the upper end of the vertical standard with the locking pin engaged therein, the mounting and biasing means for the locking pin being shown in section; and FIGURE 9 is an enlarged cross-sectional view of the portion of the standard illustrated in FIGURE 8 with a portion of the inner end of the locking pin broken away for purposes of illustration.

Referring now more specifically to the drawings, reference numeral 10 generally designates the plant packer comprising the present invention. The plant packer 10 includes a crosshead 12 having two laterally spaced depending legs 14 pivotally mounted thereon at points spaced equidistant in from each end 16 of the crosshead 12. The lower end of each of the legs 14 is bifurcated and spread, as best seen in FIGURE 2, and has a packing jaw 18 rigid therewith, this packing jaw 18 including side panels 20, a rear panel 22, and a top 24, all angularly related and forming a cutting or penetrating lower edge 26.

Extending vertically upward from approximately the center of the crosshead 12 is the standard 28, suitable bracing 30 being provided as needed for insuring the desired rigidity between the standard 28 and the crosshead 12. The standard 28 has an elongated groove 32 extending along one side 34 thereof, this groove having a flat bottom 36 and terminating at its upper end in an abutment shoulder 38. A recess 40 is provided in the groove bottom 36 with the uppermost wall of the recess 40 being substantially in alignment with the shoulder 38 as best seen in FIGURE 9, the purpose of the groove 32 and recess 40 to be gone into presently.

Slidably mounted on the standard 28 is the guide means 42, this guide means 42 consisting of two laterally spaced vertical plates 44 positioned adjacent to and on opposite sides of the standard 28. Mounted between the plates 44 is a first pair of rollers 46 rotatably engageable within the groove 32 so as to, in addition to providing for a substantially friction-free sliding of the guide means 42 relative to the standard 28, also act so as to stabilize the standard and guide means, these rollers 46 substantially filling the groove 32 as seen in FIGURE 5.

A second pair of vertically spaced rotatable wheels 48 is provided in rolling engagement with the opposite side 50 of the standard 28, this side 50 preferably also being flat, a groove similar to groove 32 also being contemplated for this side 50 if considered desirable. This last pair of rollers 48, rather than being rotatably mounted on the plates 44, are instead rotatably mounted on opposed narrow vertically extending flat bars 52, these bars 52 being located between the plates 44 on opposite sides of the wheels 48 and adjustably mounted by means of a transversely extending shaft 54 fixed to the bars 52 above the uppermost wheel 48, the outer ends of the shaft 54 extending through horizontal elongated slots 56 in the plates 44 whereby the wheels 48 may be laterally adjusted toward and away from the standard 28 thus varying the clamping force exerted on the standard between the wheels 46 and 48 and consequently providing for insuring a continuous and proper guiding relationship between the standard 28 and guiding means 42 and additionally allowing for an adjustment of the amount of force needed to close the packing jaws 18. In order to provide for this adjustment, an elongated threaded adjusting screw 58 is provided, the screw being adjustably threaded through a transversely extending plate 60 rigidly secured to the plates 44, a suitable locknut 62 being provided to lock the adjusting bolt 58 in an adjusted position. The forward end of the adjusting bolt 58 is received within a recess 64 in the rear of a transverse plate 66 extending between the flat bars 52 between the rollers 48, a turning of the adjusting bolt 58 producing a forward clamping movement of the rollers 48 with this movement being guided by the slots 56.

In order to both hold and actuate the packer 10, a handle 68 is provided, this handle 68 being preferably rectangular in shape and constructed of a hollow tube presenting a substantially horizontal handgrip portion 70 and spaced free ends 72 secured rigidly between the upper edges of the plates 44 in a manner so as to allow for the free passage of the standard 28 therethrough. It will of course be appreciated that any other suitable handles are considered to fall within the present invention, such handles necessarily having to allow for free movement of the standard 28.

In order that the vertical movement of the guide means 42 on the standard 28 be translated into a closing movement of the jaws 18 as contemplated in the present invention, linkage means 74 are provided therebetween, this linkage means consisting of upper operating arms 76 pivotally connected between the plates 44 on opposite sides of the guide means 42 and diverging therefrom for pivotal connection at their lower ends to downwardly converging lower arms 78. The lower end of each of the lower arms 78 is rigidly secured to the upwardly and outwardly directed leg 80 of a substantially right angular elbow 82, the apex of which is rotatably mounted on the projecting ends 16 of the crosshead 12 with the second leg 84 thereof projecting downwardly and outwardly. Extending between the outer end of the lower leg 84 of the elbow 82 and an intermediate point on the adjoining leg 14 is an adjustable connecting rod 86, this connecting rod 86 being pivotally mounted at both ends thereof. While not specifically limited thereto, it is preferred that this connecting rod 86 include a lower threaded shaft 88 threadedly telescoped within an upper tube 90, suitable adjusting and locking nuts 92 being provided. It will be appreciated that such a linkage arrangement enables a user of the device to exert a substantial packing force on the packing jaws 18 by a downward forcing of the handle 68 and guide means 42 secured thereto, an appreciable mechanical advantage being realized from the linkage means 74 with the relationship between the links of the linkage elements being substantially as illustrated in FIGURES 1 and 4, the upper arms 76 being approximately ten inches long, the lower arms 78 approximately nine inches long, and the connecting rods 86, while adjustable, being normally about five inches long. Inasmuch as, in both instances, the lower arm 78 is rigidly engaged with and angularly orientated relative to the lower leg 84, it will be recognized that the ratio of the horizontal component of the load applied to the arm 78 to the horizontal component of the resistance encountered by the leg 84 is the inverse ratio of the vertical projection of the respective lever arms. Thus, the substantially greater length of arm 78 relative to leg 84 results in the above noted appreciable mechanical advantage.

Inasmuch as the hands 94 of the user are to normally be positioned vertically above the upper end of the standard 28, it is desired that the relative movement between the handle 68 and standard 28 be limited, this being accomplished by the provision of a laterally projecting stop 96, extending from either one or both sides of the standard 28 at a point below the lower edge of the guide means plates 44 a sufficient distance so as to both avoid contact with the hands 94 and also to insure a proper compacting or packing of the soil about the plant in the manner of FIGURE 4. It will be noted that this stop 96 engages the bottom edge of the plates 44.

Further, inasmuch as it is desirable to effect a firm seating of the packing jaws 18 in the soil prior to a closing of these jaws, a locking means is provided. This locking means includes a locking pin 97 having the forward end 98 thereof receivable within the recess 40, this forward end 98 having a wheel rotatably mounted therein and projecting slightly forward thereof. Locking pin 97 is mounted for lateral movement within a housing 102 rigid with the upper edge of the guide means 42, this housing 102 having a coiled biasing spring 104 therein surrounding the locking pin 97 and engaged between the rear of the housing 102 and the collar 106 on the locking pin 97 so as to bring the forward end 98 of the pin 97 into the recess 40 upon alignment of the pin with the recess. It will of course be appreciated that various other types of biasing means can be used, for example, a leaf spring. After the packing jaws 18 have been thrust into the earth the desired distance, the locking pin 97 is withdrawn from the recess 40 by means of a trigger mechanism 108 pivotally mounted on the handgrip portion 70 and interconnected to the rear of the pin by means of an elongated cable 110, this cable extending through the hollow tubular handle 68, suitable openings 112 being provided therein. It will be noted that the trigger mechanism 108 is mounted so as to enable a grasping thereof without removing the hands 94 from the handle 68. Further, after withdrawing the locking pin 97 and commencing the downward movement of the guide means 42 relative to the standard 28, the trigger mechanism 108 can be released so as to enable the directing of the user's entire strength to producing the desired packing force, the small roller 100 rotatably provided on the forward end of the locking pin 97 rolling in a substantially friction-free manner along the bottom 36 of the groove 32. After the packing of a plant is completed, the user merely lifts upward on the handle 68 thus raising the guide means 42 along the standard 28 until the locking pin 97 engages against the abutment shoulder 38 at which time it is simultaneously biased into the recess 40 with any further upward pull on the handle means 68 resulting in a withdrawal of the packing jaws 18 from the earth.

The operation and use of the plant packer of the present invention is considered apparent from the above description. With the packing jaws 18 locked in an open position by means of the locking pin 97 being engaged within the recess 40, the packer, held by a grasping of the handle means 68, is thrust downwardly so as to embed the packing jaws 18 within the earth on the opposite sides of a plant to be packed. Subsequently, the trigger mechanism 108 is pulled so as to disengage the locking pin 97 with a further downward force on the handle means 68 resulting in a pushing of the packing jaws 18 toward each other so as to effect the desired packing of the earth, this movement of the jaws towards each other being limited by the guiding means 42 coming in contact with the stop 96. In order to remove the packer 10, the user merely lifts upward on the handle with the guide means 42 rising along the standard 28 until the locking pin engages within the recess 40 at which time the entire packer 10 is lifted, it now being ready for use in packing another plant.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A plant packer comprising a pair of opposed packing jaws, a crosshead, said jaws being mounted at spaced points on said crosshead for vertical pivotal movement relative thereto between an open and a closed position, a standard mounted on the crosshead intermediate the jaws, guide means slidably receiving the standard for solely vertical movement of the guide means on the standard, handle means mounted on said guide means, linkage means interconnecting said packing jaws and said guide means for effecting a closing movement of said jaws upon a vertical movement of the guide means relative to the standard, and a releasable lock means for optionally preventing relative movement of the guide means and standard when said jaws are in an open position, said guide means consisting of a pair of laterally spaced vertical plates lying adjacent opposite sides of said standard, first roller means rotatably fixed between said plates and engageable with one side of said standard, second rotatable roller means adjustably mounted between said plates and engageable with the side of said standard opposite from said one side, and means for adjusting said second roller means toward and away from said standard for varying the clamping engagement of both roller means with the standard.

2. The device of claim 1 wherein each of said first and second roller means consists of a pair of vertically spaced rollers.

3. The device of claim 1 including a longitudinally extending groove along said one side of the standard, said first roller means being engageable within said groove for guiding movement therealong.

4. A plant packer comprising a pair of opposed packing jaws, a crosshead, said jaws being mounted at spaced points on said crosshead for vertical pivotal movement relative thereto between an open and a closed position, a standard mounted on the crosshead intermediate the jaws, guide means slidably receiving the standard for solely vertical movement of the guide means on the standard, handle means mounted on said guide means, linkage means interconnecting said packing jaws and said guide means for effecting a closing movement of said jaws upon a vertical movement of the guide means relative to the standard, and a releasable lock means for optionally preventing relative movement of the guide means and standard when said jaws are in an open position, said linkage means consisting of downwardly diverging upper arms, pivotally connected to the guide means, downwardly converging lower arms pivotally connected to the lower ends of said upper arms, respectively, downwardly diverging members rigid with the lower ends of the lower arms, respectively, pivot means securing the outer ends of the crosshead at the apex between the lower end of each of the converging lower arms and the diverging member rigid therewith, and adjustable connecting rods pivotally interlocking the diverging rigid members and the packing jaws, said downwardly converging arms being substantially longer than the downwardly diverging members associated therewith so as to obtain a significant mechanical advantage.

5. The device of claim 1 wherein said standard includes a recess adjacent the upper end thereof, said releasable lock means being rigid with the guide means and including a locking pin projecting therefrom toward said standard for engagement within said recess, means biasing said pin toward said standard, and trigger means engageable with said pin for effecting its withdrawal from said recess, said trigger means being mounted for easy access by the user of the device.

6. A plant packer comprising a pair of opposing packing jaws, a crosshead, said jaws being mounted at spaced points on said crosshead for vertical pivotal movement relative thereto between an open and a closed position, a standard mounted on the crosshead intermediate the jaws, guide means slidably receiving the standard for vertical movement of the guide means on the standard, handle means mounted on said guide means, linkage means interconnecting said packing jaws and said guide means for effecting a closing movement of said jaws upon a vertical movement of the guide means relative to the standard, said guide means consisting of a pair of laterally spaced vertical plates lying adjacent opposite sides of said standard, first roller means rotatably fixed between said plates and engageable with one side of said standard, second rotatable roller means adjustably mounted between said plates and engageable with the side of said standard opposite from said one side, and means for adjusting said roller means toward and away from said standard for varying the clamping engagement of both roller means with the standard.

7. A plant packer comprising a pair of opposed packing jaws, a crosshead, said jaws being mounted at spaced points on said crosshead for vertical pivotal movement relative thereto between an open and a closed position, a standard mounted on the crosshead intermediate said jaws, guide means slidably receiving the standard for vertical movement of the guide means on the standard, handle means mounted on said guide means, and linkage means interconnecting said packing jaws and said guide means for effecting a closing movement of said jaws upon a vertical movement of the guide means relative to the standard, said linkage means consisting of downwardly diverging upper arms pivotally connected to the guide means, downwardly converging lower arms pivotally connected to the lower ends of said upper arms, respectively, downwardly diverging members rigid with the lower ends of the lower arms, respectively, pivot means securing the outer ends of the crosshead at the apex between the lower end of each of the converging lower arms and the diverging member rigid therewith, and connecting rods pivotally interconnecting the diverging rigid members and the packing jaws, said downwardly converging arms being substantially longer than the downwardly diverging members associated therewith so as to obtain a significant mechanical advantage.

8. The device of claim 7 wherein said connecting rods are longitudinally adjustable so as to vary the orientation of the packing jaws.

References Cited in the file of this patent

UNITED STATES PATENTS

| 785,742 | Lipps | Mar. 28, 1905 |
|---|---|---|
| 901,820 | Nelson | Oct. 20, 1908 |
| 1,885,377 | Robinson | Nov. 1, 1932 |
| 2,035,967 | Humphrey | Mar. 31, 1936 |
| 2,638,713 | Edwards | May 19, 1953 |

FOREIGN PATENTS

| 45,291 | Norway | June 25, 1928 |